Oct. 13, 1953 C. P. KRUPP 2,654,922
INFLATABLE CLOSING STRIP FOR AIRCRAFT
Filed June 15, 1950 3 Sheets-Sheet 1
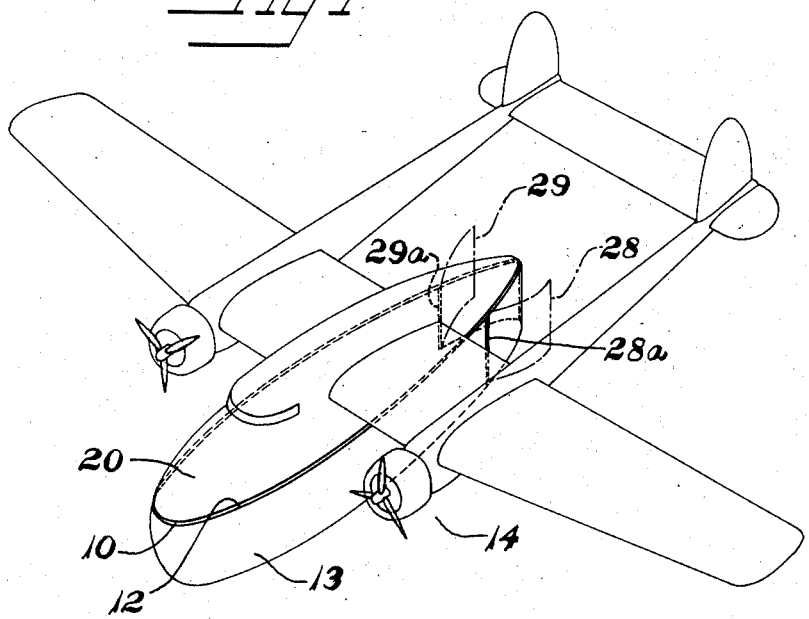
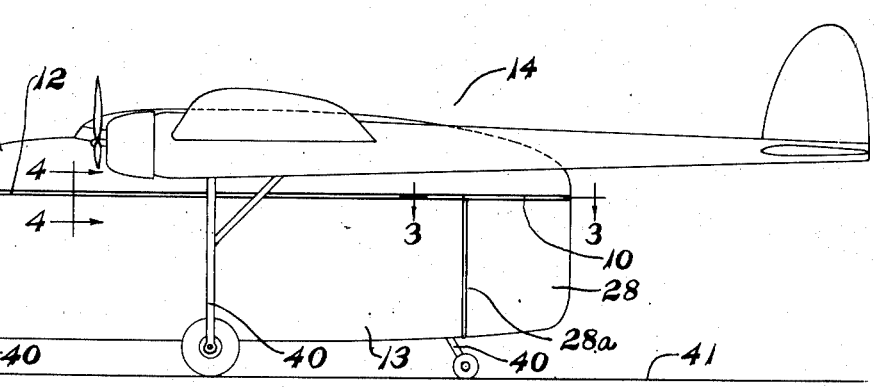
Inventor
Carroll P. Krupp
By Dwight L. Moody
Atty.

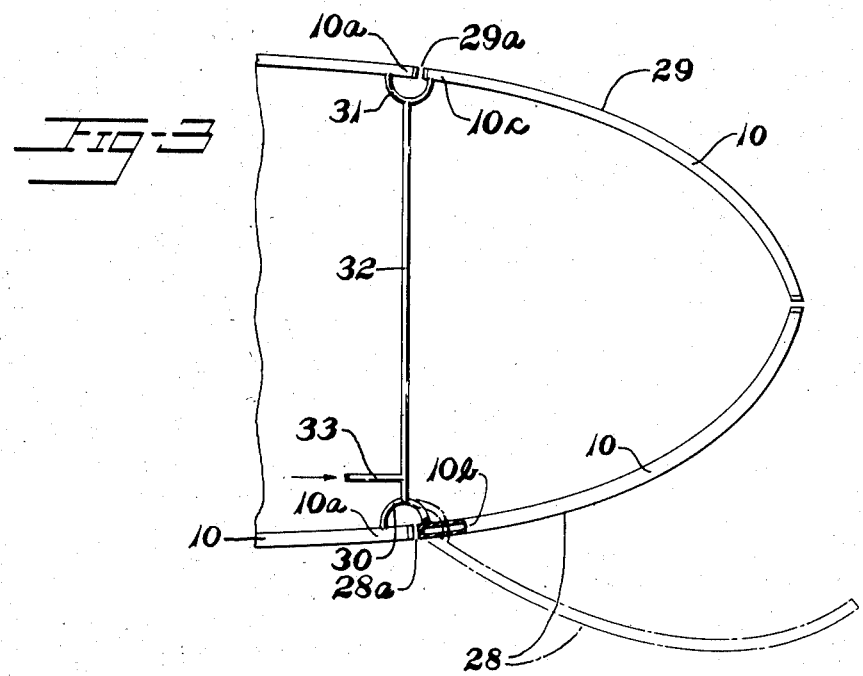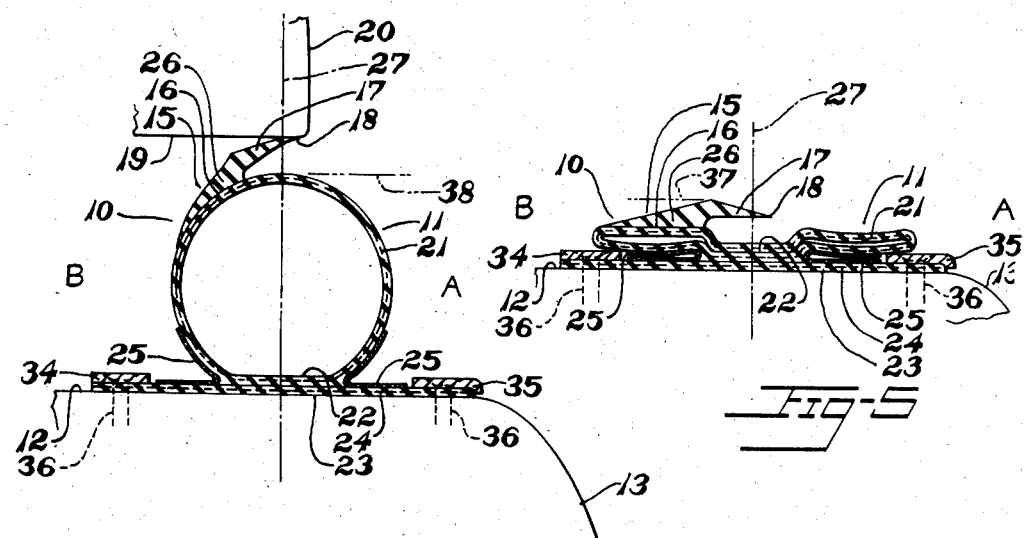

Oct. 13, 1953  C. P. KRUPP  2,654,922
INFLATABLE CLOSING STRIP FOR AIRCRAFT
Filed June 15, 1950  3 Sheets-Sheet 3
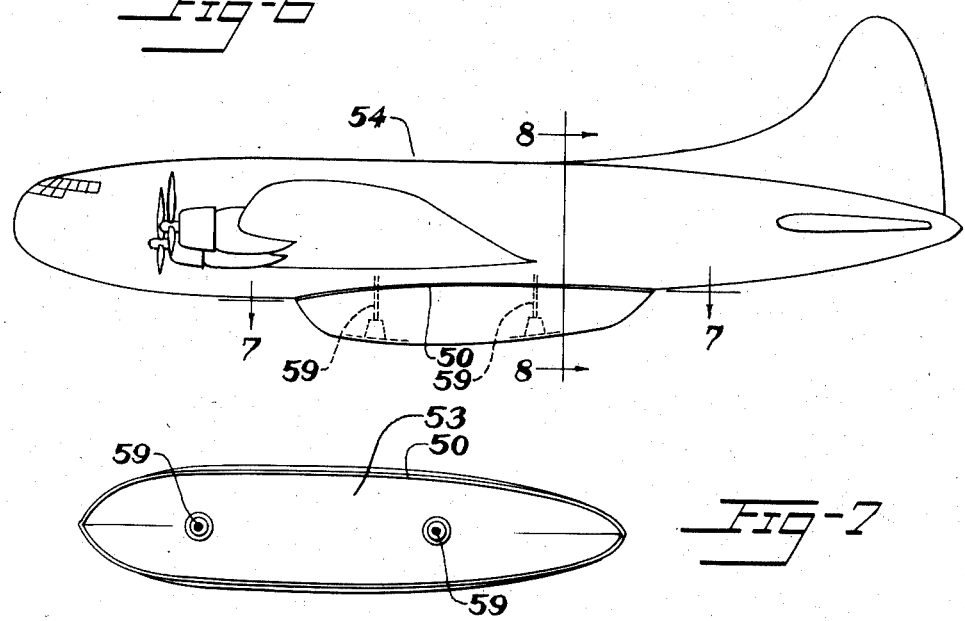
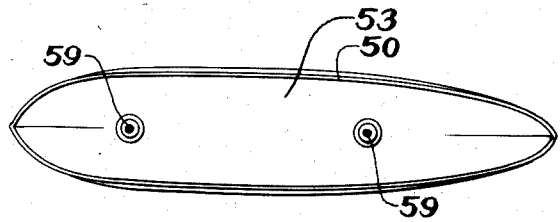
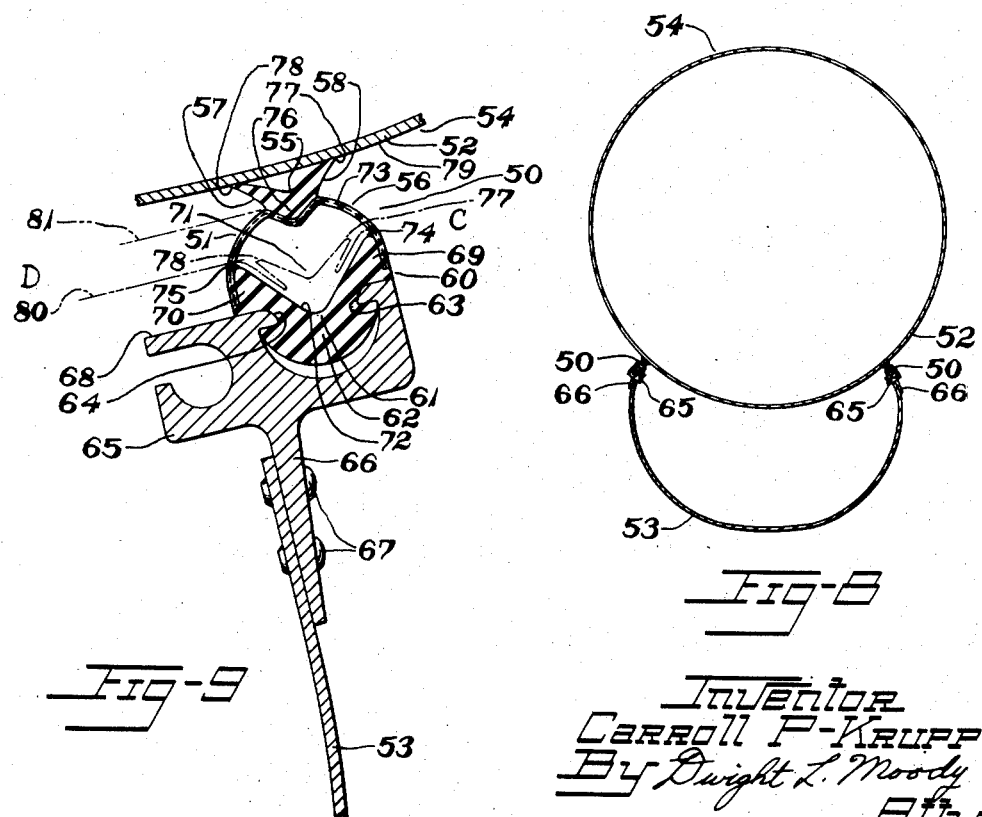
Inventor
Carroll P. Krupp
By Dwight L. Moody
Atty

Patented Oct. 13, 1953

2,654,922

UNITED STATES PATENT OFFICE 2,654,922

INFLATABLE CLOSING STRIP FOR AIRCRAFT

Carroll P. Krupp, Cuyahoga Falls, Ohio, assignor to The B. F. Goodrich Company, New York, N. Y., a corporation of New York Application June 15, 1950, Serial No. 168,274

16 Claims. (Cl. 20—69)

This invention relates to inflatable closures for spaced-apart structures such as separable sections or parts of aircraft and other structures, wherein good inflated height and effective closure without high unit force on the closing surface are desired.

The total amount of separating force exerted by plain inflated tubing upon the structures has been found to be objectionably great in the case of aircraft with long surfaces to be closed, because extra material is required in the structures to resist the separating force of the closure and extra strong fasteners are required to hold the structures together in their spaced relationship. Also, the tubing having generally a very thin, uniformly thick, all-rubber wall construction has provided only limited distension sometimes resulting in faulty closing at regions of curvature of the surfaces and has been objectionably fragile.

An object of the invention is to provide an inflatable closure for aircraft overcoming effectively the foregoing and other disadvantages of prior constructions.

Other objects are to provide an improved inflatable closing strip which closes effectively the space between spaced-apart structures without exerting undue separating force on the structures; to provide for a tubular construction of the strip wherein the total inflated height of the strip is substantially greater than that permitted by an inflatable tube alone; to provide for a high ratio of inflated height to deflated height of the strip; to provide for effecting low closing force of the strip against a structure in a manner independent of the inflating pressure.

Further objects are to provide for resisting blow-out of the strip despite extensive distension of the same; to provide effectively for preventing the accumulation of ice on the strip in its inflated condition; to provide for a closing action of the strip in a direction transversely of the strip or closing actions in both directions transversely of the strip; to provide for swinging movement and for flexure of a closing element of the strip; to provide for a nested relationship of portions of the strip in the deflated condition; and to provide for simplicity and durability of construction, convenience of manufacture, and for effectiveness of operation.

These and other objects and advantages of the invention will be apparent from the following description:

In the accompanying drawings which form a part of this specification,

Fig. 1 is a perspective view from above of an airplane of a cargo-transport type having an embodiment of an inflatable closure closing the space between upper and lower sections or compartments of the airplane constructed in accordance with and embodying the invention, broken lines showing rear doors of the cargo compartment in the open condition, Fig. 2 is a side elevation of the structure of Fig. 1 showing the airplane on the landing field, Fig. 3 is a sectional view taken along line 3—3 of Fig. 2 showing the closure between the rear door portions and the front portion of the compartments, parts being broken away, Fig. 4 is a view taken along line 4—4 of Fig. 2 showing the closure in the inflated condition, parts being broken away, Fig. 5 is a transverse sectional view of the closure in the deflated condition mounted on the cargo compartment of the airplane, parts being broken away, Fig. 6 is a side elevation of a military airplane having a modified construction of the closure for closing the space between a fuselage and a dependent life boat of the airplane, Fig. 7 is a view taken along line 7—7 of Fig. 6, Fig. 8 is a transverse sectional view taken along line 8—8 of Fig. 6, and Fig. 9 is a transverse sectional view in an enlarged scale of the closure.

The form of inflatable closure shown in Figs. 1 to 5, inclusive, of the drawings, includes an inflatable strip 10 having a tubular inflatable member 11 which may be disposed on an upper supporting surface 12 of a structure such, for example, as a detachable, dependent, cargo compartment 13 of a multi-engined, twin-boom, cargo-transport type airplane 14. A flexible, structure-engaging, closing element 15 is mounted on a distensible wall 16 of the tubular member 11 along the strip and has a projecting portion 17 forming a cantilever lip transversely overlying the strip in spaced-apart relation to the wall 16 for flexure of the portion 17 relative to the wall 16 in the inflated condition of the strip 10, as shown especially in Fig. 4, so as to press yieldably and positively against a lower closing surface 19 of a structure such, for example, as a fuselage compartment 20 of the airplane 14.

The tubular member 11 or inflatable tube is made of resilient, natural or synthetic rubber, or other rubber-like material, or combinations thereof having extensive flexibility at low temperatures and has, desirably, a continuous, annular reinforcement 21 of elastic fabric such, for example, as knitted or stockinette material of nylon, silk, cotton, glass fibers or other suitable filamentary material embedded in the rubber material of the distensible wall 16, preferably intermediate the thickness of the wall. The wall 16 is not only of continuous, annular and fluid-tight construction but is also of substantially uniform thickness, thin, stretchable, and highly flexible construction wherein the reinforcement 21 may be disposed for stretchability transversely of the strip 10 with substantially less stretchability longitudinally of the strip to provide directional and stable extensibility of the wall 16. The reinforced construction of the tube 11 resists blow-out of the strip, resists deterioration from the action of oil, weather and other harmful conditions, and maintains its flexibility under conditions of extreme cold such as are found at high altitudes of flight.

For facilitating the attachment of the strip to the upper supporting surface 12 of the cargo compartment 13, the wall 16 of the inflatable tube at the lower region of the same may have a base portion 22 of substantial width adhesively secured, as by a suitable rubber cement of the air-curing type, to an attaching base 23 of suitable flexibility, thickness and width for the intended purpose and made of suitable rubber material having therein a reinforcement 24 of square-woven textile fabric material of cotton or other suitable filamentary material. The relatively wide zone of attachment of the tube 11 at its base portion 22 to the reinforced attaching base 23 provides for stable support of the tube 11 in the inflated condition so as to resist wobbling or objectionable transverse shifting of the tube about the base 23 under the action of varying wind pressure against the exterior or exposed side of the tube indicated by the letter A. Reinforcing tapes 25, 25 of suitable thin, flexible, rubber and fabric construction may be adhesively secured to the opposite sidewalls of the tube 11 and to the side margins of the base 23 in overlapping relation therewith, as shown especially in Figs. 4 and 5, for resisting loosening and separation of the tube 11 from the base 23 without substantial stiffening of the sidewalls against flexure in the deflated condition of the tube.

The closing element 15 is made, desirably, of suitable resilient rubber material and may be extruded to the desired strip form and cross-sectional shape for mounting adhesively on the wall 16 of the tube 11. The closing element has a mounting portion 26, desirably triangular in cross-section for graduated flexure purposes, secured to the wall 16 at a position to a side of and spaced from the vertical plane at 27 passing through the longitudinal axis of the tube 11 so as to provide for outward swinging of the projecting portion 17 relative to the wall 16 to an oblique disposition in the inflated condition of the strip so that the projecting portion 17 and the wall 16 of the tube 11 diverge to form an acute angle as shown in Fig. 4, whereby the total increase or gain in height of the strip from its retracted height is substantially greater than that permitted by the tube 11 alone. The mounting portion 26 may be located at the interior side of the strip 11 indicated by the letter B.

The portion 17 of the closing element 15 desirably tapers to an edge 18 and projects across the wall 16 transversely of the strip from the thickest end of the triangular-in-section mounting portion 26 toward the vertical center plane at 27 in overlying unattached relation to the adjacent underlying outer surface of the distensible wall 16. The portion 17 is of substantial extent transversely of the strip and for the deflated condition of the strip shown in Fig. 5, has the edge 18 positioned, preferably, at or a little beyond the vertical center plane at 27 toward the exterior side of the strip 10 for facilitating maximum total gain in height of the strip by the swinging action of the portion 17 under inflation of the tube 11. This makes feasible closing a separating distance between the structures substantially exceeding the diameter of the inflated tube 11. The portion 17 may be disposed generally parallel to the horizontal plane of the base 23 in the deflated condition of the strip.

When the wall 16 at the closing element 15 bulges and swings from its generally parallel attitude relative to the base 23 upwardly and radially outward of the tube to a curved and approximately oblique attitude relative to the base 23 under inflation of the tube 11, the mounting portion 26 flexes and swings correspondingly with the bulged wall. This compels the tapered portion 17 to shift and swing upwardly and transversely toward the interior side of the strip 11 to an oblique disposition relative to the adjacent distensible wall 16 and facing toward the exterior side of the strip, the edge 18 traveling, by virtue of the swinging movement of the portion 17, upwardly to the advanced position of the strip at the overlying surface 19 of the fuselage 20, the gain in height of the edge being substantially greater than that permitted by the inflation of the tube 11 alone.

The inflatable strip 10 comprising the base 23, the tube 11 and the closing element 15 can be assembled in the desired lengths to suit the particular application. The fabric and rubber parts of the respective components may be integrally united as by vulcanization under heat and pressure.

The inflatable strip 10 may extend continuously along the upper peripheral surface 12 of the cargo compartment 13 from the front end of one rear swinging door 28, around the front or nose section, and back to the front end of the other rear swinging door 29 of the compartment. Individual inflatable strips 10, 10 may be disposed on the upper supporting surfaces 12, 12 of the doors 28, 29. The end portions of the tubes of the respective strips may be suitably flattened and interiorly taped and then sealed air-tight as by a suitable adhesive.

Adjacent closed end portions 10a, 10b and 10a, 10c, respectively, of the three strips 10, 10, 10 at the hinged mounting at 28a, 29a, of the doors 28, 29 are inflatably interconnected by suitable flexible conduits 30, 31 which are in communication with a suitable source of inflating air under pressure through suitable flexible conduits 32, 33, as shown especially in Fig. 3.

Each of the three strips 10, 10, 10 may be secured to the supporting surface 12 by metal clamping bands 34, 35 of substantial thickness extending along opposite side margins of the base 23 of each strip and by suitable screw fasteners 36, 36 spaced-apart along the bands and engaging the same, the base 23 and the cargo compartment structure. Preferably, the base 23 of each strip is suitably adhered to the supporting surface 12 to facilitate holding securely the inflatable tube 11 and closing element 15 in position on and conformingly to the surface 12. The spaced-apart, overlying disposition of the bands 34, 35 on the base 23 provides a channel space between the bands for nesting partially the wall 16 of the tube 11 within the channel in the deflated condition of the strip, as shown especially in Fig. 5.

In the operation of the inflatable closure described hereinabove, the tube of the strip 10 is inflatable from its retracted height or position at 37, i. e. the overall height of the deflated strip, as shown especially in Fig. 5, to position at 38, as shown especially in Fig. 4, which position is the maximum vertical travel or inflated height of the distensible wall 16 above the base 23. The upward and outward swinging movement of the wall 16 toward the interior side at B during inflation of the tube 11 compels flexure and swinging movement of the closing element 15 from the retracted position at 37 to a greater increase in height than the increase in height of the position at 38 of the wall 16 and to the desired oblique disposition of the portion 17, as shown especially in Fig. 4, so that the advanced position or overall height of the strip 10 in the inflated condition is substantially greater than that of the position of the wall 16, and also the increase in height is greater, thus providing the desired high ratio of overall inflated height to overall deflated height of the strip 10.

This is advantageous to accommodate differences in the positioning of the opposed surfaces 12 and 19 of the cargo compartment 13 and the fuselage 20, respectively, along their peripheral extent, while facilitating closing effectively the space between the surfaces by virtue of the engagement of the tapered portion 17 by lip-action flexure at its edge 18 with the closing surface 19 of the fuselage, the portion 17 being in flexed condition relative to the wall 16 for effecting a light yet sufficient closing force along the edge 18 independently of the inflating pressure of the tube 11. Since the tapered portion 17 in the inflated condition of the strip has an oblique disposition facing toward the exterior side of the strip, the pressure of wind at the exterior side at A against the portion 17 tends to flex further the portion 17 about the mounting portion 26 and relative to the wall 16 and thus increase the pressure of the thin edge 18 against the surface 19, thereby further facilitating closing effectively the space between the fuselage and the cargo compartment.

In view of the fact that the closing force of the strip 10 exerted along the edge 18 of the closing element 15 is independent of the inflating pressure and due largely to the resilient flexing of the rubber material of the element 15, the total force of the strip tending to separate the fuselage and the cargo compartment is substantially less than that of an inflated tube alone which is adapted to close an equivalent space between spaced-apart structures. This is advantageous in reducing the weight of the airplane structures to be held together and in reducing the size, weight and number of fasteners (not shown) for holding the structures in their spaced relationship.

The invention makes feasible utilizing a relatively smaller tube 11 as compared to closures having an inflatable tube alone for closing the space between structures, whereby a relatively thinner, more flexible, yet sufficiently strong wall construction for the intended inflating pressure can be used for the smaller tube or a wall of the same thickness as that required for the tube alone type closure can be used, if desired, as for greater strength of the smaller tube to resist blowout.

For flight of the aircraft 14 under icing conditions the inflating pressure of the strip may be fluctuated to provide for flexure of both the wall 16 and the closing element 15 for preventing the accumulation of ice thereon, during which flexure of the strip the closing of the space between the structures is nevertheless maintained effectively by virtue of the flexing and swinging action of the tapered portion 17 of the closing element.

The inflatable closure permits the attachment and detachment of the cargo compartment while the aircraft 14 is standing still on its landing gear 40, 40 upon an airport landing runway 41, as shown in Fig. 2. The inflatable closure facilitates closing the space between the fuselage and the cargo compartment even though different compartments be attached to the same fuselage at different times thereby resulting in variations in the height of the space to be closed. This is advantageous especially in military service of the airplane, when one compartment 13 may be loaded with supplies for infantry troops, or another equipped with radio apparatus, or still another be fitted as a command post, since the same airplane can be utilized to carry any one of the different compartments.

The modified construction of the inflatable closure shown in Figs. 6 to 9, inclusive, comprises an inflatable strip 50 having a tubular inflatable member 51 and a flexible closing element 55 mounted on the outer surface of a distensible wall 56 of the member along the strip, the closing element having a pair of projecting portions 57, 58 forming cantilever lips extending across the wall 56 in opposite directions transversely of the strip in overlying spaced-apart relation to the wall 56 as shown in Fig. 9, and extending upwardly of the strip and outwardly of the wall 56 in diverging relation one to the other to provide closing actions in two directions transversely of the strip. The inflatable strip 50 is constructed to give good inflated height and to close the space between the structures without high unit force on the closing surface, and may have an endless construction especially for closing the space between a fuselage 52 and a detachable life boat 53 of a multi-engined military airplane 54, the boat being carried in spaced-apart, dependent relation to the fuselage by suitable supporting-attaching means 59, 59.

The tubular inflatable member 51 has a flexible, fluid-tight, channeled base 60 of suitable resilient rubber material which is desirably extruded in strip form and has a bottom portion 61 including a dependent locking portion 62 of suitable shape in cross-section such, for example, as a bulbous or a semi-circular shape. The channeled base portion is provided with opposed seating grooves 63, 64, one at the exterior side of the strip indicated at C and one at the interior side of the strip indicated at D, as shown in Fig. 9, which grooves receive inwardly projecting ribs of a stiff, suitably recessed attaching rim 65 of suitable metal material such, for example, as aluminum alloy, the rim having a dependent flange 66 secured to the hull of the boat 53 as by spaced-apart rivets 67, 67. The bulbous locking portion 62 of the tubular member 51 when disposed in the bulbous locking recess of the attaching rim 65, anchors the inflatable strip 50 to the rim with the bottom portion 61 backingly supported by an upper supporting surface 68 of the rim.

The bottom portion 61 of the base 60 interconnects upwardly projecting, transversely spaced-apart marginal portions or sidewalls 69, 70 thereby providing a longitudinal channel 71, desirably with generally inclined or sloping sides in the upper face 72 of the base 60. The transverse configuration which may be generally V-shaped, the width and the depth dimensions of the channel 71 are such that they facilitate a nested disposition of both the distensible wall 56 and the closing element 55 in the channel for the deflated condition of the strip, as shown in broken lines in Fig. 9, while freedom of movement of the distensible wall 56 and the closing element 55 from and to their nested disposition under inflation and deflation of the strip is also facilitated.

Although the proportions and shape of the base 60 may vary from those shown especially in Fig. 9, it is desirable that the shape, thickness, and stiffness of the bottom portion 61 and sidewalls 69, 70 be sufficient to inherently resist collapse of the base 60 and to maintain position of the sidewalls 69, 70 in their spaced, upstanding relation. The construction results advantageously in the base 60 sustaining to a large extent the stress due to mounting the inflatable strip upon the curved attaching rim 65.

The distensible wall 56 of the tubular member is preferably of suitable fluid-tight, resilient, reinforced, rubber material construction and relatively thin, stretchable and flexible as compared to the base 60. A reinforcement 73 of suitable elastic fabric is arranged in the rubber material of the wall 56 for stretchability transversely of the strip with substantially less stretchability longitudinally of the strip to provide directional extensibility of the wall 56. The reinforced construction resists breakage of the wall 56 at its regions of sharp flexure, especially adjacent the upper region of the side walls 69, 70 and resists blow-out of the strip.

The distensible wall 56 extends transversely of the base 60 in overlying, separated relation to the channeled upper face 72 intermediate the margins 74, 75 thereof and may be adhesively secured in overlapping relation to the sidewalls 69, 70 for facilitating resistance to distortion transversely of the sidewalls under inflation of the strip. The wall 56 defines with the channeled base 60 an inflating space, and is of greater width intermediate the margins 74, 75 than the channel 71 so as to have slack in the deflated condition and be received in inwardly turned condition within the channel.

The closing element 55 of suitable resilient rubber material may have a mounting portion 76 adhesively secured to the distensible wall 56 so that the closing element extends longitudinally and substantially centrally along the inflatable strip 50. The mounting portion 76 of the closing element and distensible wall 56 are positionable in the channel 71 and if desired, in substantially conforming relation to the face 72 of the channel 71 in the deflated condition of the strip, as shown in broken lines in Fig. 9.

The pair of projecting portions 57, 58 which extend upwardly from the mounting portion 76 in diverging relation to one another, may be tapered and may terminate in edges 77, 78 for contacting the fuselage 52 at its under-surface 79 which is spaced from and overlies the inflatable strip 50 in the deflated condition, and also the supporting surface 68 of the attaching rim 65. Desirably, the edges 77, 78 for the deflated condition of the strip as shown by broken lines in Fig. 9 are at a position not exceeding the retracted height or position at 80 of the inflatable strip, i. e. the overall height of the deflated strip including the closing element 55 is that indicated by the retracted position at 80.

The fabric and rubber parts of the respective elements of the inflatable strip 50 are preferably united integrally as by vulcanization. The strip for its application to the life boat 53 may be made endless by diagonally splicing together the ends of the strip and may be connected in a suitable manner to a suitable source of inflating air under pressure.

In the operation of the inflatable closure described hereinabove for the aircraft 54, the strip 50 is inflatable from its retracted height or position at 80, as shown especially in Fig. 9, to an inflated position at 81 which is the maximum inflated height of the distensible wall 56 above the base 60. The upward and outward movement of the wall 56 to its bulged form during inflation of the tubular member 51 compels movement of the closing element 55 from the retracted position at 80 to a greater height than that of the inflated position at 81 of the wall 56, so that the total increase in height of the strip in the inflated condition is substantially greater than the increase in height permitted by the wall 56 in the inflated condition of the strip, thereby providing the desired high ratio of overall inflated height to overall deflated height of the strip 50.

For the inflated condition, the tapered portions 57, 58 in engagement at their edges 77, 78 with the surface 79 of the fuselage 52 are in a flexed condition and exert a light but sufficient closing force along the edges independently of the inflating pressure of the tubular member 51. Since the tapered portion 57 has an oblique disposition facing toward the interior side at D of the strip, internal pressure of air within the fuselage 52 and boat 53 tends to press the portion 57 more firmly against the surface 79, while the other tapered portion 58 having an oblique disposition facing toward the exterior side of C of the strip is pressed more firmly against the surface 79 by the pressure of wind at the exterior side, both of these closing actions facilitate closing effectively the space between the fuselage and the life boat by virtue of the dual lip-action flexure of the edges 77, 78 against the surface 79. The total closing force of the strip 50 tending to separate the fuselage and the life boat is substantially less than that of an inflated tube alone for closing the same space between the spaced-apart structures, inasmuch as the light closing forces exerted by both edges 77, 78 of the closing element 55 are independent of the inflating pressure, thus providing the desired closing of the spaced-apart structures without high unit force against the closing surface 79.

Variations may be made without departing from the scope of the invention as defined in the following claims.

I claim:

1. An inflatable closing strip for closing the space between spaced-apart structures and inflatable from a retracted height to an advanced height, said strip having a channeled face providing a channel, and having a flexible wall having said face constituting a part thereof, said flexible wall by virtue of the channel shape thereof providing slack therein being inflatable from its position within said channel to an inflated height substantially outward of the channel beyond said retracted height, and a closing element mounted on said wall at said face thereof and along the strip, said closing element having tapered elastic portions of elongated form in cross-section substantially projecting outwardly from said face of said wall in diverging relation one to the other, said tapered portions being positioned in said channel within said retracted height in the deflated condition of the strip and being disposed at a height outwardly of the channel substantially greater than that of said inflated height so that the total increase in height of the strip in its inflated condition is substantially greater than the increase in height of said wall in said inflated condition of the strip.

2. An inflatable strip for closing the space between spaced-apart structures, said strip comprising a tubular inflatable member comprising a channeled base for support by one of said structures and a flexible wall mounted on said base and extending across the channel to define therewith an inflating space and having an outer face for facing toward the other structure, said flexible wall being of greater width than said channel so as to have slack in the deflated condition of the strip and be disposed normally in inwardly turned condition within said channel in said deflated condition of the strip, and a closing element mounted on said wall at its outer face and along said member, said closing element having tapered portions of elongated form in cross-section and of resilient rubber material substantially projecting outwardly from said outer face of said wall in diverging relation one to the other, said tapered portions being positioned wholly within said channel in the deflated condition of the strip and being disposed at a height outwardly of said channel substantially greater than the inflated height of said wall so that the total increase in height of the strip in its inflated condition is substantially greater than the increase in height of said wall in said inflated condition of the strip.

3. An inflatable strip as defined in claim 2 in which said channeled base comprises resilient rubber material and has a locking portion of reduced width projecting downwardly therefrom along the strip for seating in a recess of said one of said structures, and in which said flexible wall comprises resilient rubber material having an elastic fabric reinforcement therein.

4. An inflatable strip for closing the space between spaced-apart structures and for mounting on one of the structures so as to be inflatable from a retracted height adjacent the structure to an advanced height remote from the structure, said inflatable strip having spaced-apart side margins and comprising a distensible wall extending transversely of the strip from one of said side margins to the other side margin and joined to said side margins to provide an inflating chamber, said wall having an outer surface for facing toward the other structure and being distensible from the retracted height under inflation of the strip, and a closing element overlying and attached to said wall at said outer surface thereof at a position thereon intermediate said spaced-apart side margins and extending along the strip, said element projecting from its position of attachment to said wall across the wall in a direction transversely of the strip and in adjacent separated relation to said wall in the deflated condition of the strip and having an overall height outwardly of said wall within the retracted height of the strip in its deflated condition, and said element projecting from said position of attachment to said wall in a direction outwardly away from and at an acute angle to said outer surface of the wall to a height coinciding with the advanced height of the strip when said wall is distended and outwardly curved by inflation of the strip so that the total increase in height of the strip in the inflated condition is substantially greater than the increase in height of said wall in the inflated condition of the strip.

5. An inflatable strip for closing the space between spaced-apart structures and for mounting on one of the structures so as to be inflatable from a retracted height adjacent the structure to an advanced height remote from the structure, said strip comprising a base for attachment to said one of the structures, a distensible wall overlying and connected to said base to provide therewith an inflating chamber and said distensible wall being distensible from the retracted height under inflation of the strip and having an outer surface overlying said base for facing toward the other structure, and a closing element of resilient rubber material overlying and attached to said wall at said outer surface thereof and extending along the strip and said closing element having a tapered cantilever lip portion projecting from the region of attachment of said element to said wall across said wall in a direction transversely of the strip and in overlying spaced-apart relation to said outer surface of said wall in the deflated condition of the strip and having an overall height outwardly of said wall within the retracted height of the strip in its deflated condition and said tapered cantilever lip portion projecting from said region of attachment to said wall in a direction outwardly away from and at an acute angle to said outer surface of the wall to a height coinciding with the advanced height of the strip when said wall is distended and outwardly curved by inflation of the strip so that the total increase in height of the strip in the inflated condition is substantially greater than the increase in height of said wall in the inflated condition of the strip.

6. An inflatable strip for closing the space between spaced-apart structures, said strip comprising a channeled base for mounting on one of the structures, a flexible wall mounted on said base and extending across the channel to define therewith an inflating space and having greater width than said channel so as to have slack in the deflated condition of the strip and be disposed normally in inwardly turned condition within said channel in said deflated condition of the strip and having an outer surface overlying said channel, and a flexible closing element overlying said channel and attached to said wall at said outer surface and extending along the strip and having a depth approximately equal to that of said channel and an overall width less than that of said channel so as to be received within said channel along with said wall upon deflation of the strip, said closing element having a pair of sealing portions substantially projecting outwardly relative to said outer surface of said wall and in diverging relation to one another for contacting the other of said structures, said wall by virtue of its flexibility and greater width than said channel being inflatable from its position within said channel to a structure-engaging position of said closing element substantially outward of said channel for contacting the other of said structures in sealing relation therewith.

7. An inflatable strip comprising a distensible wall for mounting on a base so as to define therewith an inflating space, and a structure-engaging closing element mounted on said wall at the outer surface thereof and along the strip and having a marginal portion extending across said wall in a direction transversely of the strip and in overlying unattached relation to said outer surface of said wall in the deflated condition of the strip, that part of said wall directly underlying said marginal portion of the closing element flexing away from said marginal portion upon inflation of the strip.

8. An inflatable strip comprising a base, a distensible wall overlying and connected to said base to define therewith an inflating space, and a structure-engaging closing element mounted on said wall at the outer surface thereof and along the strip and having a marginal portion extending across said wall in a direction transversely of the strip and in overlying unattached relation to said outer surface of said wall in the deflated condition of the strip, that part of said wall directly underlying said marginal portion of the closing element flexing away from said marginal portion upon inflation of the strip.

9. An inflatable strip comprising an elongated distensible wall having means formed for mounting said wall on a base to provide an inflating chamber, and an elongated structure-engaging closing element substantially coextensive with and joined to said wall and having a flexible cantilever lip portion extending across and overlying said wall in the deflated condition of the strip, said lip portion and said wall diverging to form an acute angle, when said strip is inflated, to facilitate ready flexure of said lip portion relative to said wall when engaging an opposed structure.

10. An inflatable strip comprising an elongated flexible base, an elongated distensible wall overlying and substantially coextensive with and joined to said base to provide therewith an inflating chamber, and an elongated structure-engaging flexible closing element mounted on the external surface of said wall and extending along said wall substantially coextensive therewith, said closing element having a cantilever lip portion of elastic material extending across and overlying said wall in spaced relation thereto in the deflated condition of the strip, said cantilever lip portion projecting obliquely outward relative to said external surface of said wall, when said strip is inflated, to facilitate elastic flexure of said cantilever lip portion relative to said wall when engaging an opposing structure.

11. An inflatable strip comprising an elongated flexbile base, an elongated distensible wall overlying and substantially coextensive with and joined to said base to provide therewith an inflating chamber, and an elongated structure-engaging flexible closing element substantially coextensive with and externally mounted on and extending along said wall at a position therein spaced substantially from said base, said closing element having a cantilever lip portion of resilient rubber material tapering to an edge and extending across said wall in overlying spaced-apart relation thereto in the deflated condition of the strip, the tapered cantilever lip portion and said wall diverging to form an acute angle, when said strip is inflated, for facilitating resilient flexure of the tapered cantilever lip portion relative to said wall when said edge is contacting an opposed structure.

12. An inflatable strip for closing the space between spaced-apart opposed structures, said strip comprising an elongated tubular inflatable member of impervious flexible material for mounting on one of the structures, said member having an elongated distensible wall of said material for facing toward the other structure, and an elongated flexible closing element of less width than that of said member in its deflated condition externally mounted on and extending along said distensible wall substantially coextensive therewith, said closing element having a flexible marginal portion extending across said distensible wall in overlying spaced-apart relation thereto in the deflated condition of the strip, said marginal portion and said distensible wall diverging to form an acute angle, when said strip is inflated, for facilitating flexure of said marginal portion relative to said distensible wall when engaging said other structure.

13. An inflatable strip for closing the space between spaced-apart opposed structures, said strip comprising an elongated tubular inflatable member of impervious flexible material for mounting on one of the structures, said member having an elongated distensible wall for facing toward the other structure, and an elongated closing element of elastic material of less width than that of said member in its deflated condition externally mounted on and extending along said distensible wall substantially coextensive therewith, said closing element having a tapered marginal portion of said elastic material terminating in a thin edge and extending across said distensible wall in overlying spaced-apart relation thereto in the deflated condition of the strip, said tapered marginal portion projecting obliquely outward relative to said distensible wall, when said strip is inflated, for facilitating elastic flexure of said tapered marginal portion relative to said distensible wall when said thin edge is contacting said other structure.

14. An inflatable strip for closing the space between spaced-apart opposed structures, said strip comprising an elongated tubular inflatable member for mounting on one of the structures and having an elongated distensible wall comprising impervious resilient rubber material and an elastic fabric reinforcement therein for facing toward the other structure, and an elongated closing element of resilient rubber material of less width than that of said member in its deflated condition externally mounted on and extending along said wall substantially coextensive therewith, said closing element comprising a cantilever marginal portion of said resilient rubber material tapering to a thin edge and extending across said wall in overlying spaced-apart relation thereto in the deflated condition of the strip, said cantilever marginal portion and said wall diverging to form an acute angle, when said strip is inflated, to facilitate resilient flexure of said cantilever marginal portion relative to said wall when said thin edge is contacting said other structure.

15. An inflatable strip for closing the space between spaced-apart opposed structures, said strip comprising an elongated tubular inflatable member including an elongated flexible base for mounting on one of the structures and including an elongated distensible wall substantially coextensive with and joined to said base for inflating movement of said wall outwardly and upwardly relative to said base so that said wall has an upper region thereof overlying and spaced substantially from said base for facing toward the other structure, and an elongated flexible closing element externally mounted on and attached to said wall at said upper region thereof and extending along said wall substantially coextensive therewith, said closing element comprising a cantilever lip portion of resilient rubber material extending across said wall in overlying spaced-apart relation thereto to permit swinging movement of said cantilever lip portion about the region of attachment of said closing element outwardly and upwardly to an oblique disposition relative to said wall upon inflation of the strip.

16. An elongated inflatable strip for mounting between and peripherally about spaced-apart opposed structures normally subject to greater fluid pressure to one side of the strip in its mounted inflated condition as compared to that to the other side thereof, said inflatable strip comprising an elongated tubular inflatable member of impervious flexible material for mounting on and extending peripherally about one of the structures, said member having an elongated distensible wall of said material intermediate its side margins for facing toward the other structure, and an elongated flexible closing element substantially coextensive with and joined to said wall and having a flexible cantilever lip portion overlying and extending across said wall in the direction toward the greater fluid pressure side of the strip, and terminating in an edge, said cantilever lip portion and said wall diverging to form an acute angle facing in said direction, when said strip is inflated, to facilitate ready flexure of said cantilever lip portion relative to said wall, when initially engaging and pressing against said other structure, and to facilitate increased yieldable pressing of said edge of the cantilever lip portion against the other structure under the influence of said greater fluid pressure to said one side of the strip.

CARROLL P. KRUPP.

References Cited in the file of this patent

UNITED STATES PATENTS

| Number | Name | Date |
|---|---|---|
| 2,401,624 | Petter et al. | June 4, 1946 |
| 2,444,114 | Pevney | June 29, 1948 |
| 2,530,160 | Finley | Nov. 14, 1950 |